(12) United States Patent
Marcy

(10) Patent No.: US 9,174,501 B2
(45) Date of Patent: Nov. 3, 2015

(54) BALL HITCH CONVERSION SYSTEM

(71) Applicant: Dewey R. Marcy, Greeley, CO (US)

(72) Inventor: Dewey R. Marcy, Greeley, CO (US)

(73) Assignee: Quick-Hitch, Inc., Greeley, CO (US)

( * ) Notice: Subject to any disclaimer, the term of this patent is extended or adjusted under 35 U.S.C. 154(b) by 0 days.

(21) Appl. No.: 13/999,676

(22) Filed: Mar. 17, 2014

(65) Prior Publication Data

US 2015/0258865 A1    Sep. 17, 2015

(51) Int. Cl.
*B60R 9/06* (2006.01)
*B60D 1/07* (2006.01)
*B60D 1/06* (2006.01)

(52) U.S. Cl.
CPC ................ *B60D 1/075* (2013.01); *B60D 1/065* (2013.01); *B60R 9/06* (2013.01)

(58) Field of Classification Search
CPC .............. B60R 9/06; B60R 3/00; B60R 1/06; B60R 1/065
USPC ............. 280/415.1, 416.1, 416.3, 417.1, 506, 280/507, 511–513, 901; 224/402, 519, 520; 403/550, 90, 122
See application file for complete search history.

(56) References Cited

U.S. PATENT DOCUMENTS

| | | | | | |
|---|---|---|---|---|---|
| 3,659,876 | A | * | 5/1972 | Melton | 280/511 |
| 4,412,635 | A | * | 11/1983 | Bateman | 224/520 |
| 4,576,395 | A | * | 3/1986 | Longoria | 280/511 |
| 4,699,395 | A | * | 10/1987 | Hale | 280/511 |
| 4,901,896 | A | * | 2/1990 | Speer | 224/520 |
| 5,513,869 | A | * | 5/1996 | Putnam | 280/415.1 |
| 6,050,588 | A | * | 4/2000 | Kissack | 280/511 |
| 7,017,935 | B1 | * | 3/2006 | Bonfanti | 280/511 |
| 7,419,347 | B1 | * | 9/2008 | Cormier | 414/462 |
| 7,735,850 | B1 | * | 6/2010 | Curran | 280/511 |
| 7,770,870 | B1 | * | 8/2010 | Fly | 254/323 |

FOREIGN PATENT DOCUMENTS

GB        2248814    *    4/1992

* cited by examiner

*Primary Examiner* — Anne Marie Boehler
(74) *Attorney, Agent, or Firm* — Dean P. Edmundson

(57) ABSTRACT

A system is described for detachably securing a housing to a ball hitch (e.g. of the type used in trucks for towing). The system includes a tubular housing for fitting over the ball, and attachment means for detachably securing the housing to the ball. A workpiece can then be secured to the housing, as desired. A preferred attachment means is a pair of opposing lock pins which are movable between retracted and extended positions. When the pins are in the extended position, they secure the housing to the ball hitch. The type of workpieces may vary. For example, the workpiece may be a work table, a vise, a fifth-wheel hitch system, a winch, or an arm for a lift bucket.

12 Claims, 5 Drawing Sheets

BALL HITCH CONVERSION SYSTEM

CROSS-REFERENCE TO RELATED APPLICATION

This application is based upon, and claims priority from, my Provisional Application No. 61/853,269, filed Apr. 1, 2013.

FIELD OF THE INVENTION

This invention relates to ball hitch systems of the type used in trucks for pulling or towing gooseneck trailers. More particularly, this invention relates to use of a ball hitch for supporting different types of hitches or a variety of workpieces.

BACKGROUND OF THE PRIOR ART

Conventional ball hitch systems used in trucks (e.g. pickup trucks) include a ball which is secured to the frame of the truck in the bed area. A trailer can be connected to the ball for towing purposes. Normally the trailer includes a vertical stem or shank with an opening in its lower end to receive the ball. The vertical stem further includes a locking mechanism to secure the stem to the ball for towing.

Sometimes it would be of great benefit if the existing ball hitch system could be used for supporting various types of workpieces, such as a vise, or a work table, or lift bucket, for example.

U.S. Pat. No. 7,740,266 (Marcy) describes a system for attenuating intermittent forces at the interconnection between a towing vehicle and a trailer. In one embodiment the system includes an air spring or cushion which acts as a shock absorber between the trailer and the towing vehicle. The system can be connected to a ball hitch which may also include a fifth-wheel hitch for a camper trailer, for example.

There has not heretofore been provided a ball hitch conversion system having the advantages and features of the present invention.

SUMMARY OF THE INVENTION

In accordance with the present invention there is provided a system for converting a ball hitch to a support for a variety of workpieces. The workpieces may be, for example, a work table, a winch, a vise, an arm for a lift bucket (e.g. a cherry picker), a fifth-wheel hitch system, etc. In one embodiment, the support system preferably comprises:

(a) a tubular housing;

(b) attachment means for detachably securing the housing to a ball hitch in a truck bed; wherein the attachment means comprises at least one lock pin carried by the housing which is movable between retracted and extended positions; wherein when the pin is in the extended position it secures the housing to the ball hitch. A workpiece can then be secured to the tubular housing in a number of manners.

Other advantages and features of the system of this invention will be apparent from the following detailed description and accompanying drawings.

BRIEF DESCRIPTION OF THE DRAWINGS

The invention is described in more detail hereinafter with reference to the accompanying drawings wherein.

DETAILED DESCRIPTION OF THE INVENTION

Figure 1:
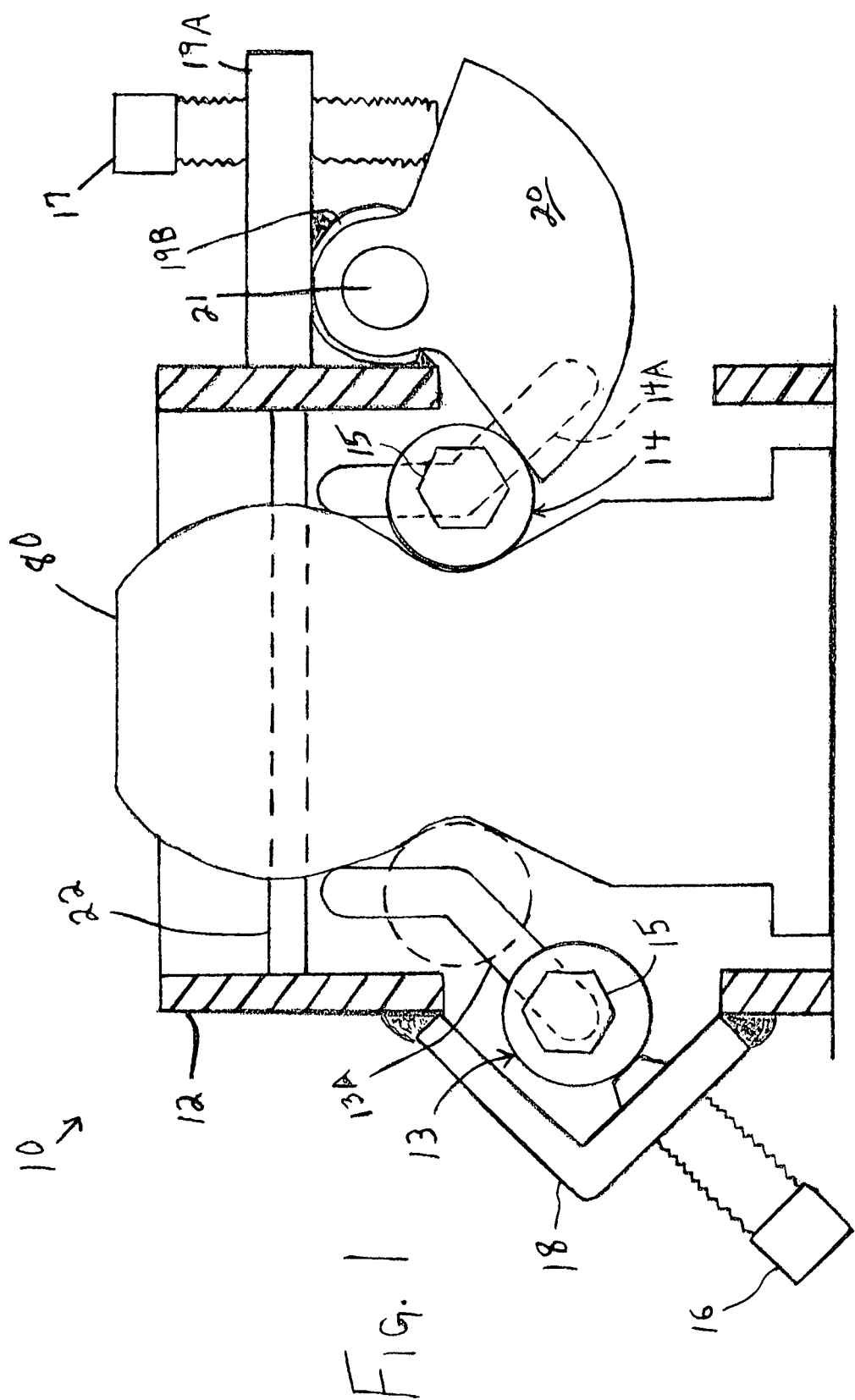
FIG. 1 is an elevational view (partially cut-away) of one embodiment of a ball hitch conversion system of the invention.

FIG. 1 shows a front elevational view, partially cut-away, of one embodiment of a ball hitch conversion system 10 of the invention. This embodiment includes housing 12 (preferably ¼ inch wall 4×4 tube) which will fit over the ball 80 of a conventional ball hitch (which is secured to a truck bed). In FIG. 1 there are shown two locking pins 13 and 14 which are adapted to move in separate guideways 13A and 14A between retracted and extended positions to lock the housing onto the ball. The locking pins preferably each comprise a cylinder which has internal threads in each end. A bolt 15 is threaded into each such end of each cylinder. The depth of the thread is matched to the length of the bolt so that when the bolts are tightened they do not clamp against the outside of the housing. Thus, each bolt and cylinder assembly is retained in the housing but can move freely in the guide slots 13A and 14A.

The means for moving the locking pins from their retracted position to their extended position may vary. FIG. 1 shows two different ways for moving the locking pins. On the left side of FIG. 1 there is shown a set screw 16 which is threadably secured in a bracket 18 welded onto the outside of the wall of the housing 12. The leading end of this screw contacts the side of lock pin 13 and causes it to move upwardly toward the neck portion of the ball. The dotted lines show the extended position of the lock pin 13 where it makes contact with the ball. On the opposite side of the ball there is shown locking pin 14 which also moves in a guideway to contact the neck portion of the ball. This pin 14 is caused to move by means of a cam member 20 which pivots about an axle or pin 21 when associated set screw 17 is turned. Brackets 19A and 19B support the cam and associated set screw 17. Bracket 19B is welded to housing 12 and also to bracket 19A and supports axle or pin 21 about which the cam can pivot.

Thus, FIG. 1 shows alternative means for moving the locking pins 13 and 14 from their retracted position to their extended positions in the housing to lock the housing to the ball. FIG. 1 also shows one type of centering or guide ring 22 welded within the housing to help center the ball within the housing. The guide ring should be positioned near the large diameter of the ball and can be a plate or a ring.

Figure 2:
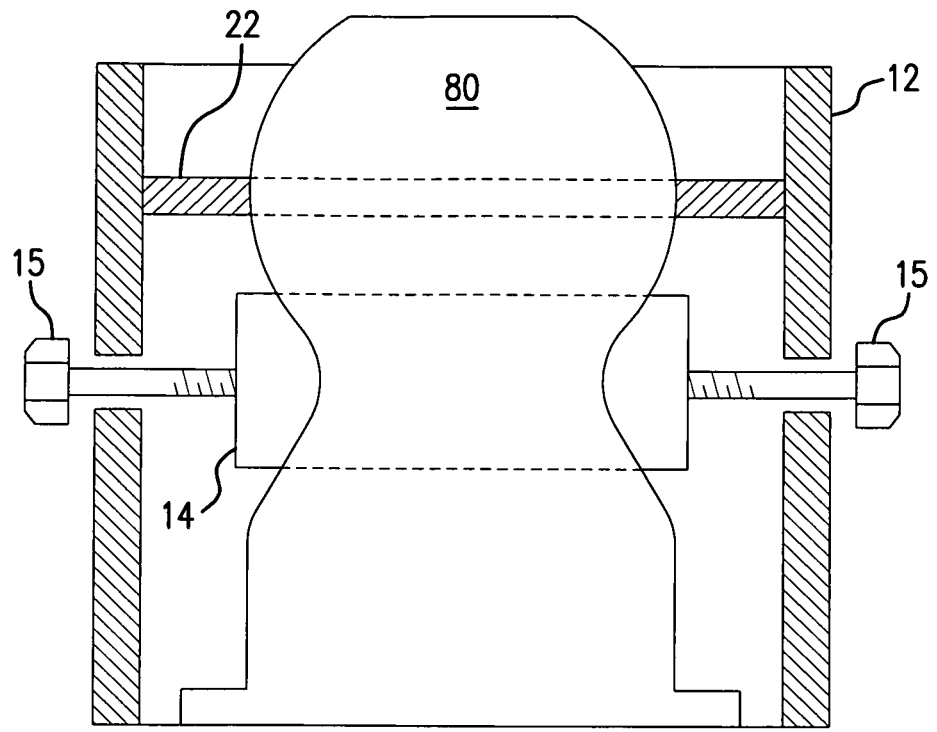
FIG. 2 is a side elevational view (partially cut-away) of one embodiment of ball hitch conversion system of the invention.

FIG. 2 is a side elevational view (partially cut-away) of the ball hitch conversion system of FIG. 1. This shows locking pin 14 positioned against the neck portion of the ball 80. It also shows the manner in which the centering ring 22 maintains the ball 80 in the center of the housing 12.

Figure 3:
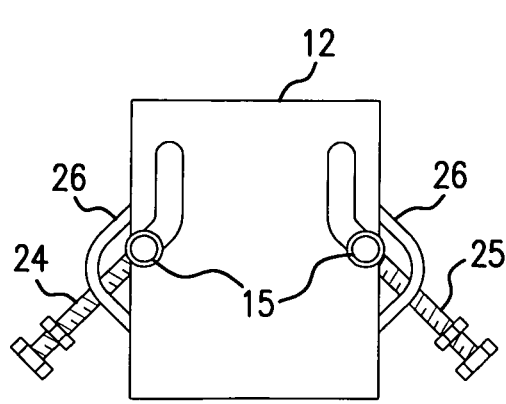
FIG. 3 is a side elevational view of another embodiment of ball hitch conversion system of the invention.
Figure 4:
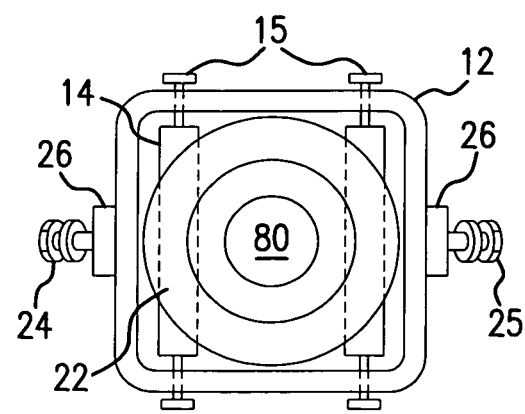
FIG. 4 is a top view of the ball hitch conversion embodiment of FIG. 3.

FIG. 3 is a side elevational view of a ball hitch conversion system in which the means for moving the locking pins involves the use of two set screws 24 and 25 which contact the pins directly to cause the pins to move upwardly in the guideways on opposite sides of the ball. The set screws are threaded through brackets 26. FIG. 4 is a top view of the ball hitch conversion of FIG. 3.

Thus, the ball hitch conversion system comprises a housing which can be positioned over a conventional hitch ball and is centered around a vertical axis of the ball. Preferably two cylindrical wedges or locking pins are included shown which have a diameter such that they can be wedged between the inside walls of the housing and the underside of the hitch ball. The system also includes means for retaining the wedges and moving them between retracted and extended positions. When the pins or wedges are forced upwardly to their extended position, the force pushes upwardly against the ball and equally forces the housing downwardly against the base of the ball, thereby locking the housing rigidly to the ball base support. Thus, anything that is fastened to the housing is also rigidly locked to the ball and its base support.

Figure 5:
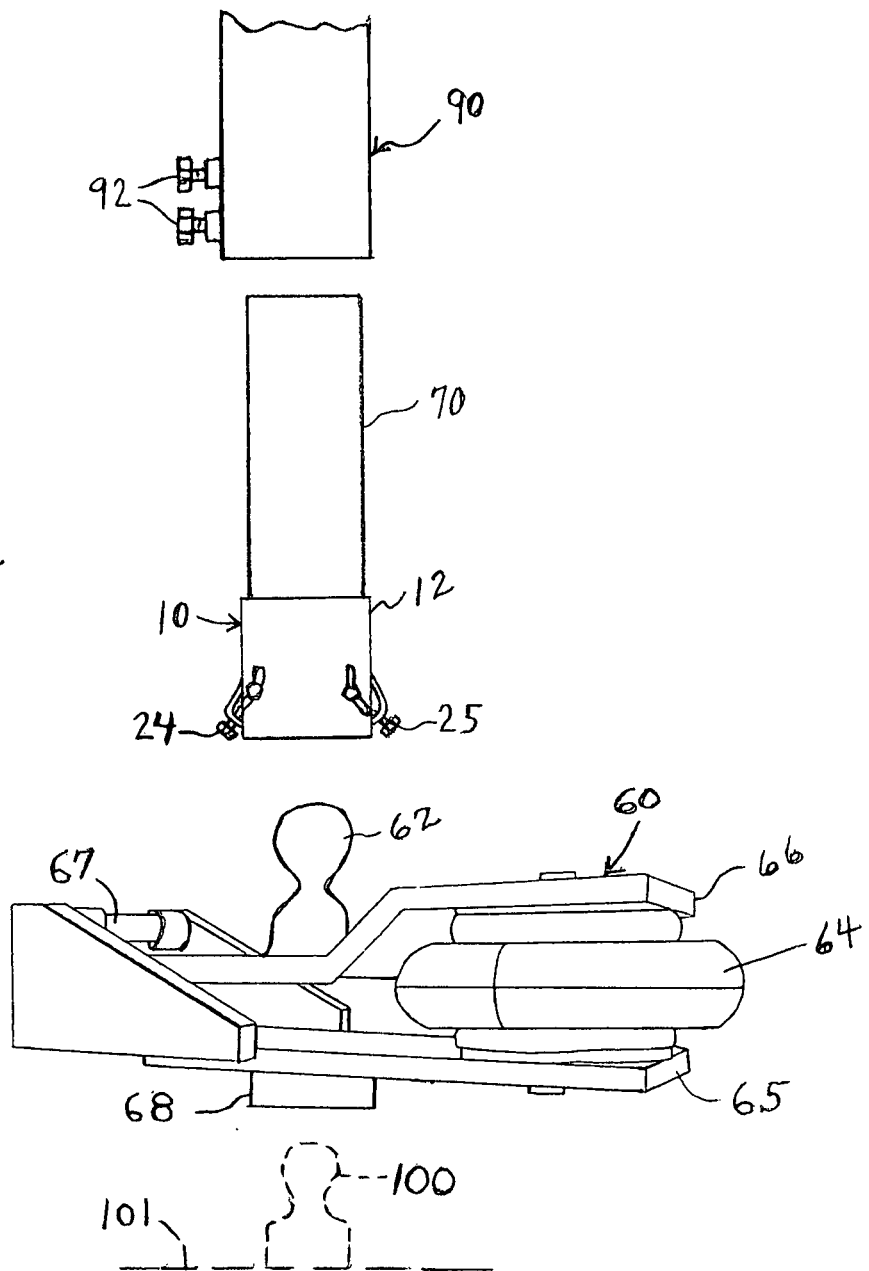
FIG. 5 is an exploded view of one embodiment of the invention in conjunction with an air cushion.

FIG. 5 is an exploded view illustrating another embodiment of a conversion hitch system of the invention. The ball capture system 10 of the invention is secured to the lower end of an elongated shank 70 which is intended to slide into the lower end of gooseneck receiver 90 on a gooseneck trailer. Set screws 92 are tightened to hold shank 70 in place.

FIG. 5 also shows an air cushion 60 which includes a ball 62 secured on its upper side which can be captured in the system 10 in accordance with this invention. The air cushion system 60 includes an inflatable air cushion 64 held between upper and lower plates 65 and 66. One end of plate 66 is hinged on bar 67 to enable plate 66 to move up and down to absorb shocks during towing. The underside of cushion system 60 includes a coupler 68 enabling it to fit over, and couple to, existing ball 100 on truck bed 101. Using the system of the invention, the air cushion can be adapted to a variety of different towing connections without modifying the cushion. This avoids the need to maintain a large inventory of special cushions. Thus, the system shown in FIG. 5 enables the cushion to stay with the trailer as opposed to staying with the truck or removing it for storage elsewhere.

Figure 6:
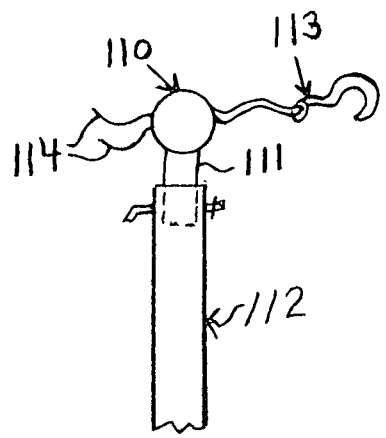
FIGS. 6, 7, 8, 9, 10 and 11 illustrate other uses of the ball hitch conversion system of the invention.

FIGS. 6-11 illustrate other uses of the ball hitch conversion system of the invention. In FIG. 6 there is shown a winch 110 on a shank 111 which is slidably received in and pinned to mounting post 112. The winch includes a cable and hook 113 and electrical leads 114. The lower end of post 112 can include the ball capture system 10 of FIG. 1, for example, so that the post can be mounted or coupled onto a conventional ball hitch in the bed of a truck.

Figure 7:
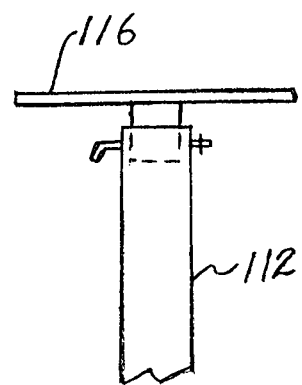

In FIG. 7 a work table 116 (e.g. for supporting a welding project) is pinned to the upper end of post 112. The lower end of post 112 can include the ball capture system of the invention.

Figure 8:
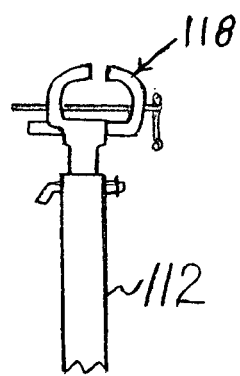
Figure 9:
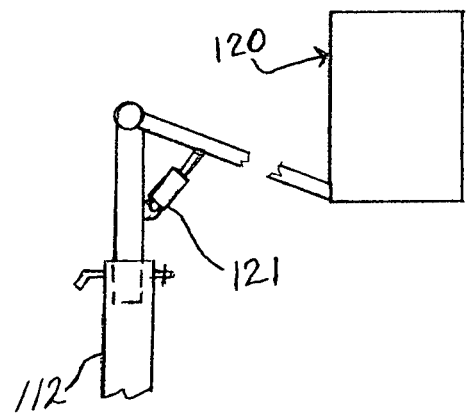

In FIG. 8 there is shown a vise 118 pinned to the upper end of post 112. In FIG. 9 there is shown a lift bucket (e.g. a cherry picker) mounted on an arm pinned to the upper end of post 112. A hydraulic cylinder 121 is used to raise and lower the bucket, as needed.

Figure 10:
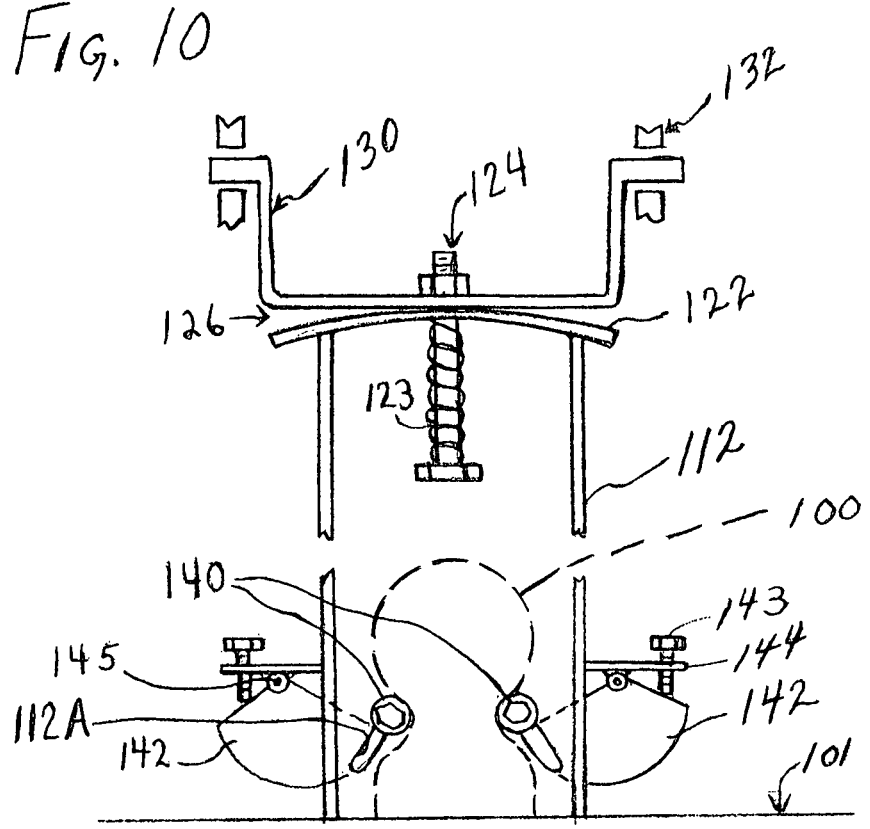

FIG. 10 is a front elevational view (partially cut-away) showing another use of the conversion system of the invention, i.e. to convert a conventional ball hitch 100 in a truck bed 101 to a fifth-wheel hitch system. The lower end of the tubular upright support member or post 112 is detachably secured to the ball 100 by means of lock pins 140 which are urged upwardly against the neck portion of the ball by pivoting cam members 142. A screw 143, threaded through bracket 144, is adapted to pivot about point 145 on each side of the ball to urge the associated cam member against a respective locking pin into the neck portion of the ball beneath the enlarged head portion of the ball.

The upper end of support member 112 preferably includes a curved support plate 122. Attached to the top of plate 122 is the yoke 130 of a conventional fifth-wheel hitch system. The fifth-wheel hitch system includes a receiver portion 132 for receiving and capturing a conventional king pin which is secured to the trailer to be towed. Preferably, the yoke member 130 is attached to the central portion of plate 122 by bolt 124. Surrounding bolt 124 is spring member 123 for biasing the yoke member back to its center position. Because of the gap 126 between the outer portions of the plate 122 and the yoke, the curved plate enables the yoke member to become tilted relative to the support member 112 (for example, when the towing vehicle and the trailer are traveling over uneven ground). This feature avoids damaging twisting of the trailer relative to the towing vehicle.

Figure 11:
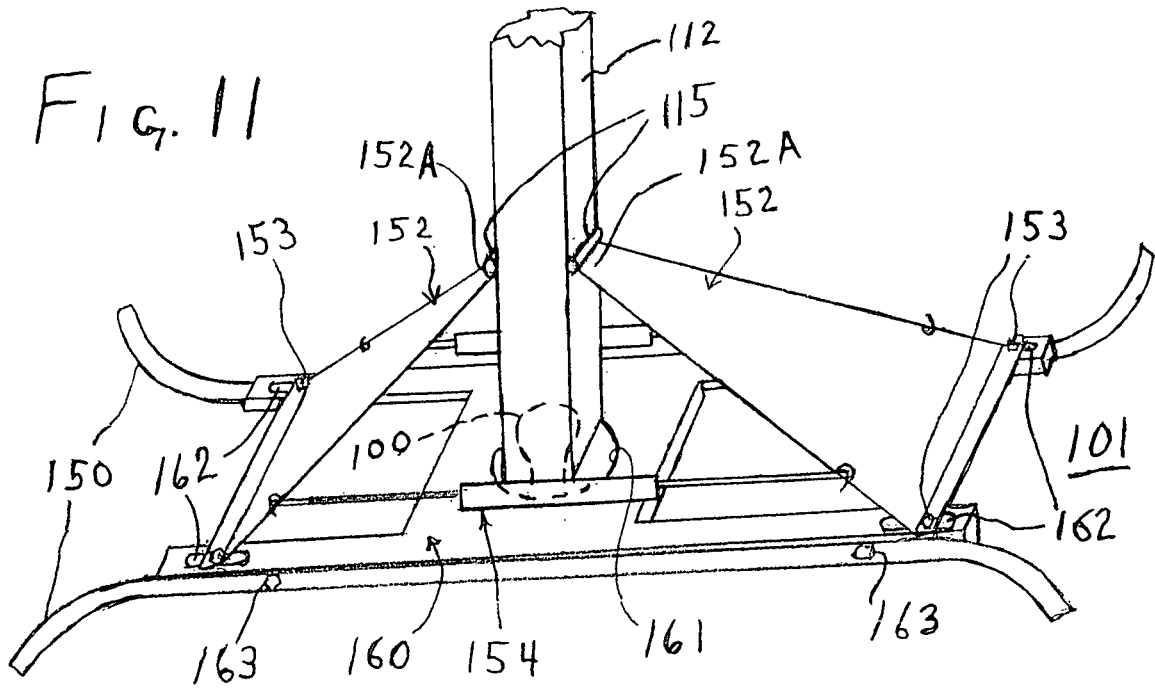

FIG. 11 illustrates one type of bracing which may be used in conjunction with use of the hitch system of FIG. 10 in a truck bed 101. In this situation, brace members 152 (located forwardly and rearwardly of the support post 112 in the truck bed) are attached at their lower ends (by means of bolts 153) to the legs of an elongated support base 160 lying on the floor of the truck bed 101, as shown. Leg extension members 150 can be bolted to the base 160 with bolts 163. The base 160 includes a centrally located opening 161 which fits around the ball 100 in the bed 101. The bolts 153 extend through the lower end of each brace 152 and through elongated slots 162 in base member 160. The upper ends 152A of the braces 152 lean against opposite sides of the support post 112 beneath stop members 115 (which may be, for example, metal bars welded or otherwise secured to the support post 112 on the forward and rearward surfaces, as shown). Turnbuckles 154 are attached at opposite ends thereof to the two braces 152. When the turnbuckles are tightened, the upper ends of braces 152 are drawn upwardly against the stop members 115, and the lower ends of braces 152 are pulled toward the support post (sliding the bolts in the slots 162) to complete triangular bracing of the support post. In this manner, the support post 112 is very rigidly held in a straight upright position during use.

The use of the ball hitch conversion system in conjunction with a fifth-wheel hitch is also described in my copending application Ser. No. 13/999,677, filed of even date. Other variants are possible without departing from the scope of this invention.

What is claimed is:

1. A ball hitch conversion system comprising:
   (a) a tubular housing including a lower end and opposing side walls; wherein said opposing side walls include inclined guideways therein;
   (b) parallel lock pins carried by said housing and extending across said housing between said opposing side walls; wherein said lock pins are movable between retracted and extended positions in said inclined guideways on opposite sides of an existing ball hitch; wherein when said pins are in said extended position they contact opposing underside surfaces of said ball hitch and rigidly secure said housing to said ball hitch; and further comprising a threaded member for urging each said lock pin upwardly from said retracted position to said extended position.

2. The conversion system in accordance with claim 1, further comprising a cam member which is moveable by said threaded member for moving said lock pins between said retracted and extended positions.

3. The conversion system in accordance with claim 1, wherein said tubular housing comprises square tubing.

4. The conversion system in accordance with claim 1, wherein said housing further comprises a centering ring for centering said ball in said housing.

5. The conversion system in accordance with claim 1, further comprising a workpiece secured to said housing.

6. The conversion in accordance with claim 5 wherein said workpiece comprises a work table.

7. The conversion system in accordance with claim 5, wherein said workpiece comprises a winch.

8. The conversion system in accordance with claim 5, wherein said workpiece comprises a vise.

9. The conversion system in accordance with claim 5, wherein said workpiece comprises an arm supporting a lift bucket.

10. The conversion system in accordance with claim 1, wherein said tubular housing comprises an elongated upright support member having an upper end, and further comprising a yoke member attached to said upper end; wherein said yoke member is adapted to be coupled to a king pin on a trailer.

11. A method for detachably mounting a workpiece to a ball hitch having a rounded upper end and a neck portion of smaller diameter than said upper end, the method comprising:
   (a) providing a tubular housing which includes opposing side walls and inclined guideways in said side walls and further comprising lock pins which are moveable between retracted and extended positions in said inclined guideways;
   (b) positioning said housing around said ball hitch;
   (c) moving said lock pins upwardly from said retracted position to said extended position such that said pins contact opposing sides of said neck portion of said ball hitch and rigidly secure said housing to said ball hitch.

12. The method in accordance with claim 11, wherein said workpiece comprises a yoke member which is adapted to connect to a king pin of a trailer.

* * * * *